G. S. GREEN & A. W. OSWALD.
GEAR TESTING MACHINE.
APPLICATION FILED JUNE 5, 1916.

1,222,392.

Patented Apr. 10, 1917.
2 SHEETS—SHEET 1.

A. W. OSWALD
G. S. GREEN

Inventors

By their Attorneys

G. S. GREEN & A. W. OSWALD.
GEAR TESTING MACHINE.
APPLICATION FILED JUNE 5, 1916.
1,222,392.
Patented Apr. 10, 1917.
2 SHEETS—SHEET 2.
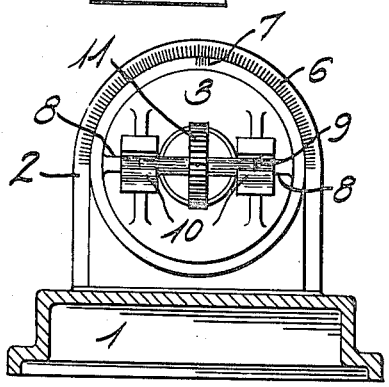
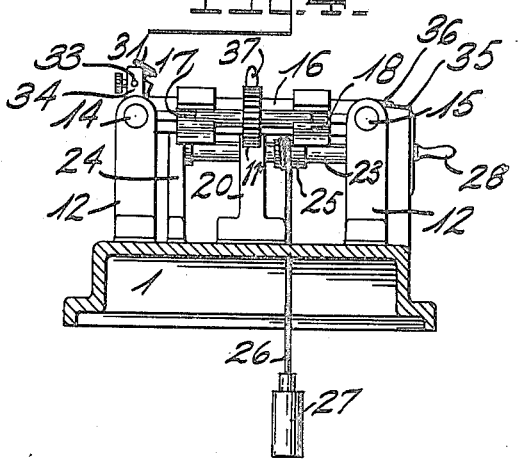
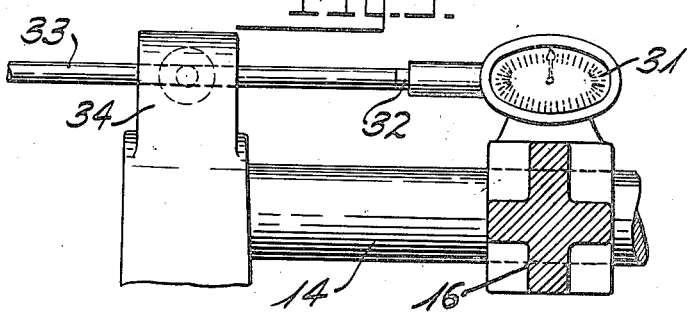
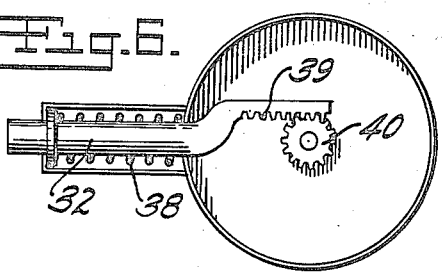
A. W. OSWALD
G. S. GREEN
Inventors
By Their Attorneys

UNITED STATES PATENT OFFICE.

GEORGE S. GREEN AND ADOLPH W. OSWALD, OF MUSKEGON, MICHIGAN.

GEAR-TESTING MACHINE.

1,222,392.  Specification of Letters Patent.  Patented Apr. 10, 1917.

Application filed June 5, 1916. Serial No. 101,820.

*To all whom it may concern:*

Be it known that we, GEORGE S. GREEN and ADOLPH W. OSWALD, citizens of the United States, residing at Muskegon, county of Muskegon, State of Michigan, have invented certain new and useful Improvements in Gear-Testing Machines, of which the following is a full, clear, and exact description.

Our invention relates to improvements in gear testing machines and has for its object to provide for testing gears a simple and efficient means in which sources of error are eliminated to a great extent. It further has for its object to provide a machine by which gears can be tested which have their axes in parallel planes without having the axes themselves parallel. It further has for its object to provide a machine having a delicate means for indicating the concentricity of the gears tested.

The following is a descripion of an embodiment of our invention, reference being had to the accompanying drawings, in which:

Fig. 3 shows a vertical transverse section on the line 3—3, Fig. 1.

Fig. 4 shows a vertical transverse section on the line 4—4 Fig. 1.

Fig. 5 shows an enlarged detail of a dial indicator and parts coöperating therewith.

Fig. 6 shows the interior of the dial indicator.

Figure 1:
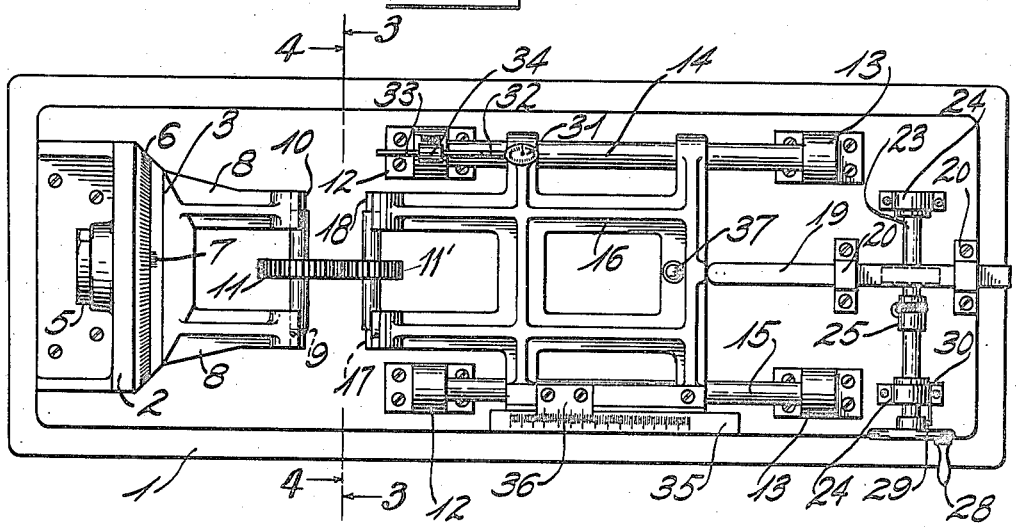
Figure 1 shows a plan view of the machine.
Figure 2:
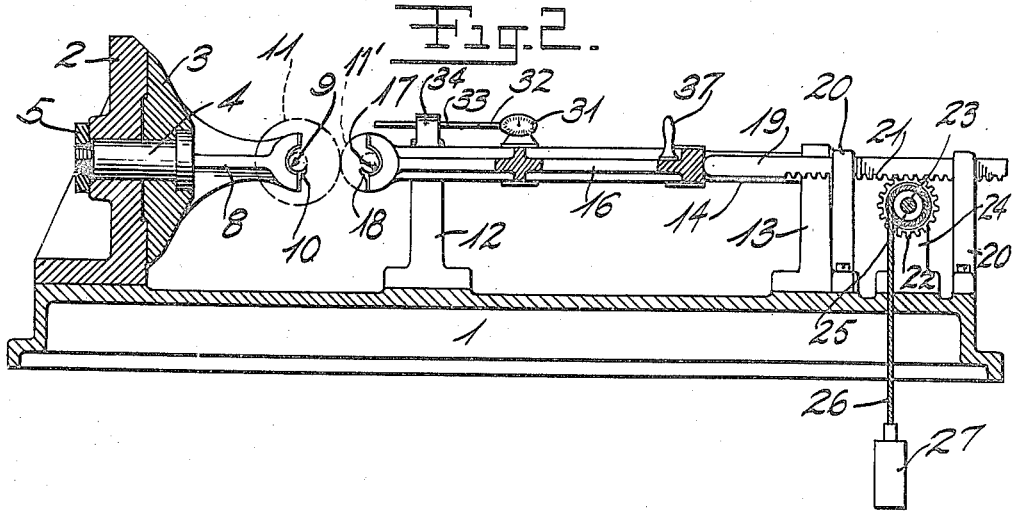
Fig. 2 shows a vertical longitudinal section through the center of the machine.

Referring more particularly to the drawings, 1 is the base of the machine supported in any suitable manner. 2 is the support secured thereto and having a vertical front face to which a disk 3 is secured by means of a bolt 4 having a nut 5 so that the disk 3 can be adjusted and clamped in any desired position relatively to the support 2. The support 2 is provided with a scale 6 and the member 3 is provided with a scale 7, the two scales being such as to enable vernier readings to be taken. Extending from the disk 3 are two arms 8 provided with half-bushings 9 and retainers 10 for holding the shaft of a master gear 11 within the half-bushings. The bushings and their support constitute a holder whose axis corresponds with the axis of the shaft of a gear supported thereby. The master gear 11 is very accurately made and is used for testing the gears to be tested. In front of the disk 3 are two standards 12 and 13 mounted upon the base 1 and rigidly supporting two large parallel cylindrical bars 14 and 15. The axes of these parallel bars lie in a plane which passes through the axis of the bolt 4 and also through the axis of the bushings 9. Slidingly mounted upon these parallel bars 14 and 15 is a carriage 16, provided at its forward end with two projections, each of which carries an open or half-bushing 17 and a retainer 18. The bushings 17 and their supporting frame constitute a holder for the gear to be tested, the axis thereof corresponding with the centers of said bushings 17 and the center of the gear shaft supported thereby. Bearing upon the rear of the frame 16 is a plunger 19 slidingly supported in a support 20 carried by the base. This plunger 19 is provided with a rack 21 on its lower side which engages with a pinion 22 carried by a shaft 23, which shaft is journaled in supports 24. This shaft 23 has a drum 25 upon which is wound a cable 26 to which is connected a weight 27. The shaft 23 is also provided with a crank handle 28 whereby the cable 26 can be wound upon the drum 25. It is also provided with a tooth 29 with which a movable stop 30 carried by one of the supports 24 is adapted to be engaged so that when engaged the weight 27 can be held in elevated position with the plunger 19 retracted. The axis of the plunger and the point at which it engages the frame 16 lie in the plane which contains the centers of the bars 14 and 15 and the axes of the bushings 9 and 17 and in the plane of the gears 11 11'. This results in the absence of any moment arm in the series of parts between the bushings 9 and the plunger 19 or its supports and of error that might be due to such a moment arm. Mounted upon the frame 16 is a dial indicator 31 having a protruding actuating stem 32 which engages with an adjustable pin 33 clamped in a socket 34 carried by one of the supports 12. The base and slide 16 are provided with a vernier scale, one part of which 35 is flexably carried by the base while the other part 36 is secured to the frame 16. The frame 16 is also provided with a handle 37 for moving the same manually. The dial indicator is so constructed that the protruding pin 32 is normally held in protruding position by a spring 38 shown in Fig. 6. The pin 32 is provided in its inner end with a rack 39, which engages a pinion 40 connected to the shaft of the pointer of the dial indicator 31. By the machine as above described it is possible to predetermine whether the pitch diameter of a gear is correct and also whether the pitch line is absolutely concentric with the axis or center of the gear, it being necessary that this pitch line should be accurately located in order that the gear shall operate properly.

The master gear referred to is of such form that the gear to be tested, if of proper shape, will, when rotated while in engagement therewith, not result in showing any variations upon the indicator.

In using our machine for the testing of ordinary spur gears the member 3 is adjusted so that the bushings 9 will hold a master gear in a position such that its axis will be exactly parallel to an axis of a gear supported by the half-bushings 17. The gear 11' to be tested is then put in place, its shaft being supported in the half-bushings 17, the frame 16 being in retracted position, the weight 27 being held in elevated position. The plunger 19 being released by the withdrawal of the detent 30 moves so as to exert a pressure against the frame 16 and bring the gears 11 and 11' into mesh. The pin 33 is then adjusted so as to partly retract the pin 32 against the action of the spring 38. A reading is then taken by means of the scales 35 and 36 to determine the distance between centers and a reading of the indicator 31 is taken. The gears 11 and 11' are then slowly revolved by hand and during this revolution the indicator 31 is observed. If the pointer of this indicator remains stationary that shows that the pitch line of the gear to be tested is concentric with the center of the axis of the shaft of the gear 11'. If, however, it moves either from the right or to the left such movement indicates a corresponding variation of the pitch line from the correct position and shows that it is not concentric.

In using the machine for the testing of a spiral gear whose axis lies in a plane parallel to the axis of the master gear but is not parallel to the master gear axis, the disk 3 is turned to the proper point as determined by the vernier scale 6 and 7 and the machine then manipulated in the same manner as that above described.

The reading of the vernier scale 35 and 36 shows the pitch center distance of the gear to be tested and this distance can be determined by that scale to within .0005 part of an inch.

As will be evident to those skilled in the art, our invention permits of various modifications without departing from the spirit thereof or the scope of the appended claims.

What I claim is:

1. In a gear testing machine the combination of a holder for a master gear, a holder for the gear to be tested, one of said holders being movable relatively toward and away from the other, said two holders having their axes parallel and in line with the path of movement of the axis of the movable holder, means for supporting said movable holder, and means for applying pressure to said movable holder at a point lying substantially in the plane of the gear carried thereby.

2. In a gear testing machine the combination of a holder for a master gear, a holder for the gear to be tested, one of said holders being movable relatively toward and away from the other, along a straight line, said two holders having their axes parallel and in the plane of the path of movement of the movable holder, means for supporting said movable holder, and means for applying pressure to said movable holder at a point lying substantially in the plane of the path of travel of the axis of said movable holder, said supporting means consisting of parallel cylindrical rods, whose centers lie in substantially said plane, and pass through portions of said movable holder.

3. In a gear testing machine the combination of a normally fixed holder for a master gear, a holder for the gear to be tested, said second holder being movable toward and away from said first holder along a straight line, said two holders having their axes parallel and in the plane of the path of movement of said second holder, means for supporting said movable holder, and means for applying pressure to said movable holder at a point lying substantially in the plane of the path of travel of the axis of said movable holder and in the plane of the master gear, said supporting means consisting of parallel cylindrical rods whose centers lie substantially in the plane of said path and pass through portions of said movable holder.

4. In a gear testing machine, the combination of a holder for a master gear, a holder for a gear to be tested, one of said holders being movable toward and away from the other, the second holder being provided with open bushings to receive the ends of a shaft carrying the gear to be tested, means for indicating variations in the relative positions of said holders.

5. In a gear testing machine, the combination of a holder for a master gear, a holder for a gear to be tested, one of said holders being movable toward the other, a dial indicator fixed relatively to one of said holders, and an abutment fixed relatively to the other of said holders and coöperating with said dial indicator, and mechanical means tending to move said movable holder toward the other holder.

6. In a gear testing machine, the combination of a holder for a master gear, a holder for a gear to be tested, one of said holders being movable toward the other, a dial indicator fixed relatively to one of said holders, and an abutment fixed relatively to the other of said holders and coöperating with said dial indicator, said abutment being adjustable toward and from said dial indicator, and mechanical means tending to move said movable holder toward the other holder.

7. In a gear testing machine, the combination of a holder for a master gear, a holder for a gear to be tested, one of said holders being movable toward the other, a dial indicator fixed relatively to one of said holders, an abutment fixed relatively to the other of said holders and coöperating with said dial indicator, and mechanical means tending to move said movable holder toward the other holder, said mechanical means being separable from said movable holder.

8. In a gear testing machine, the combination of a holder for a master gear, a holder for a gear to be tested, one of said holders being movable toward the other, a dial indicator fixed relatively to one of said holders, an abutment fixed relatively to the other of said holders and coöperating with said dial indicator, mechanical means tending to move said movable holder toward the other holder, and means for restraining said mechanical means from moving said holder.

9. In a gear testing machine, the combination of a holder for a master gear, a holder for a gear to be tested, one of said holders being movable toward the other, one of said holders being provided with a pair of half bushings for supporting the shaft of a master gear, and retainers for holding said shaft in said half bushings.

10. In a gear testing machine, the combination of a holder for a master gear, a holder for a gear to be tested, one of said holders being movable toward the other, the other holder being adjustable about an axis parallel to the line of movement of said movable holder.

11. In a gear testing machine, the combination of a holder for a master gear, a holder for a gear to be tested, one of said holders being movable toward the other, a plunger bearing against the rear of said movable holder, and means tending to move said plunger and movable holder toward said stationary holder.

12. In a gear testing machine, the combination of a holder for a master gear, a holder for a gear to be tested, one of said holders being movable toward the other, a plunger bearing against the rear of said movable holder and provided with a rack, a gear meshing with said rack and means tending to revolve said gear so as to move said plunger and movable holder toward said stationary holder.

GEORGE S. GREEN.
ADOLPH W. OSWALD.